United States Patent [19]

Nakatsuyama

[11] Patent Number: 5,727,195
[45] Date of Patent: Mar. 10, 1998

[54] DOCUMENT RETRIEVING OBJECT INSTRUCTING APPARATUS

[75] Inventor: Hisashi Nakatsuyama, Kanagawa, Japan

[73] Assignee: Fuji Xerox Co., Ltd., Tokyo, Japan

[21] Appl. No.: 422,586

[22] Filed: Apr. 14, 1995

[30] Foreign Application Priority Data

May 24, 1994 [JP] Japan .................. 6-132505

[51] Int. Cl.⁶ ................................. G06F 15/40
[52] U.S. Cl. ............... 395/601; 395/774; 364/419.19
[58] Field of Search ........................ 395/600, 601, 395/774; 364/419.19

[56] References Cited

U.S. PATENT DOCUMENTS

| | | | |
|---|---|---|---|
| 5,020,019 | 5/1991 | Ogawa | 364/600 |
| 5,140,692 | 8/1992 | Morita | 395/600 |
| 5,168,565 | 12/1992 | Morita | 395/600 |
| 5,297,042 | 3/1994 | Morita | 364/419.19 |
| 5,301,109 | 4/1994 | Landauer et al. | 364/419.19 |
| 5,347,623 | 9/1994 | Takano et al. | 395/157 |
| 5,369,742 | 11/1994 | Kurosu et al. | 395/147 |
| 5,398,338 | 3/1995 | Yoshida | 395/600 |
| 5,418,946 | 5/1995 | Mori | 395/600 |
| 5,418,948 | 5/1995 | Turtle | 395/600 |
| 5,465,353 | 11/1995 | Hull et al. | 395/600 |
| 5,488,725 | 1/1996 | Turtle et al. | 395/600 |
| 5,524,240 | 6/1996 | Barabara et al. | 395/600 |
| 5,532,833 | 7/1996 | Hong et al. | 358/335 |

OTHER PUBLICATIONS

J. Andre, R. Furuta, V. Quint, "Structured Documents," Cambridge University Press, 1989, pp. 7–38.

C. Thanos, "Multimedia Office Filing—The MULTOS Approach," 1990 pp. 114–119.

"A Query Language For Retrieving Information From Hierarchic Text Structures", I.A. Macleod, The Computer Journal, 34(3):254–264 (1991).

*Primary Examiner*—Thomas G. Black
*Assistant Examiner*—Jean M. Corrielus
*Attorney, Agent, or Firm*—Finnegan, Henderson, Farabow, Garrett & Dunner, L.L.P.

[57] ABSTRACT

In a document database managing system for managing a structured document constructed of document constructive elements, a document retrieving object instructing apparatus is employed as a query editor. The document retrieving object instructing apparatus includes instructing means for instructing a condition related to the document constructive elements in the structured document; connection condition instructing means for instructing one of a parent-child relationship and also an ancestor-descendant relationship between the document constructive elements; and retrieving means for producing a retrieve condition based upon the instructions issued from the instructing means and the connection condition instructing means and for retrieving document data stored in a database in accordance with the retrieve condition.

2 Claims, 14 Drawing Sheets

DOCUMENT RETRIEVING OBJECT INSTRUCTING APPARATUS

BACKGROUND OF THE INVENTION

1. Field of the Invention

The present invention generally relates to a document database managing system. More specifically, the present invention is directed to a document retrieving object instructing apparatus for instructing a retrieving object in a structured document in such a document database managing system for managing a structured document constructed of document constructive elements in a subdividable unit. A document described in the specification implies a text constructed of character strings, otherwise, a drawing, a table, a graph, a photograph, an image and the like, to which an index made of character strings is attached, respectively.

2. Description of the Related Art

Recently, documents are usually formed by employing such information processing apparatuses as computers and wordprocessors. In connection therewith, electronic filing apparatuses for storing these formed document data and/or document database managing systems for retrieving document data stored in these electronic filing apparatuses have been developed and are commercially available. In particular, since a chapter, a section, a paragraph, which correspond to a subdividable unit, or a figure, a graph, a table are handled as a document constructive element, and then are employed as information for retrieving these document constructive elements, reuse of these retrieved documents is promoted.

In such a structured document that a document is hierarchial-structured in a tree structure, the document is constructed of a plurality of document constructive elements such as a chapter, a section, and a paragraph (refer to "Structured Documents" by Jaques Andre, Richard Furuta, Vincent Quint, Cambridge University Press, in 1989, as to the structured document).

In document database managing systems arranged by employing structured documents as database to be managed, since such logic combinations as section, phrases, and drawings can be readily retrieved, the document database managing systems can own great advantages.

Most of the document database managing systems for managing the documents prepare query languages for retrieval works.

For instance, "Maestro", i.e., one of the document database managing systems corresponds to such a managing system for managing a document with a structure resemblance to SGML (Standard Generalized Markup Language; ISO 8879). This managing system prepares the query language similar to SQL which is one of the relevant database languages. It should be noted that "SGML" is described in, for example, "Introduction to SGML" written by Martin Bryan, ASCII Publisher, and "Maestro" is described in, for instance, "A Query Language for Retrieving Information from Hierarchic Text Structure" by Ian Macleod, THE COMPUTER JOURNAL, Vol. 34, No. 3, 1991, pages 254 to 264.

Query languages are programming languages, so that it is possible to instruct in detail retrieving objects by using the query languages. However, so as to such users and beginners, who do not usually use databases, it is difficult to use and to understand the query languages.

As a consequence, in certain general-purpose object oriented database managing systems and relevant database managing systems, query editors are equipped therewith as a system or an application. When this query editor is initiated by the user, the query editor is represented on a display screen, and then a retrieving object may be graphically designated by using this graphical user interface.

In, for instance, "Objectivity/DB" (Objectivity Inc.) and "UniSQL" (UniSQL Inc.) commercially available as the object oriented database system, the query editors called as "object query**brauzer" and "query window" respectively are prepared for the sake of user's convenience.

In these query editors, first of all, a designation is made of the class to which the object constituting the retrieving object belongs, and then the condition related to the attribute of the object is instructed on the screen where the query editors are displayed. In case that the domain (model) of the attribute is not equal to the basic data model, the editor for instructing the subquery is initiated to designate the condition. The retrieved result is such an object for satisfying the condition among the instances of the designated class.

As "MULTOS (tradename)" corresponding to one of the document database managing systems, there is the document database managing system equipped with the equery editor ("MULTOS" is described in, e.g., "Multimedia Office Filing—The MULTOS Approach" by Costantin Thanos, North-Holland, 1990).

In the above-explained query editor of "MULTOS", the retrieving object is instructed by the tree structure. At the respective nodes of the tree structure, only types are designated. At a leaf, a condition related to a content is designated. There is one sort of link which indicates that nodes at both ends are in a parent relationship. A retrieved result corresponds to a document having a partial structure capable of satisfying the condition.

FIG. 15 is a schematic block diagram for showing the arrangement of the conventional document database managing system equipped with the query editor.

In FIG. 15, the document database managing system is arranged by the query editor 151 for retrieving the desired data from the stored database, the schema managing unit 152 for managing the definitions related to the constructive elements in the documents stored into the database, and the schema storage unit 153 for storing these schema definitions. This document database managing system is further constructed of the retrieve formula producing unit 154 for producing the retrieve formula based on the retrieve condition designated by the query editor 151, the retrieve formula evaluating unit 155 for evaluating the retrieve formula produced by the retrieve formula producing unit 154 and for executing the retrieve operation based on the evaluated retrieve formula, the database 156 for storing therein the structured documents, the display control unit 157 for controlling to display the query editor 151 for designating the retrieve condition and also to display the retrieved result, and further the display unit 158 for displaying the query editor 151 and the retrieved result under control of the display control unit 157.

The query editor 151 is constituted by the domain searching unit 1511 for searching which data structure the document has based on the schema, for example, in case of the basic data model, the data structure being either the character string model, or the integer value model; the attribute name designating unit 1512 for designating either the writer of the document, or the attribute name such as the write date; and the condition designating unit 1513 for designating the retrieve condition. The query editor 151 further includes the retrieve condition holding unit 1514 for holding both of the attribute name designated by the attribute name designating unit 1512, and the retrieve condition designated by the condition designating unit 151.

FIG. 16 is a flow chart for explaining the process operation of the query editor in the conventional document database managing system. FIG. 17 is an explanatory diagram for explaining operations when the retrieve condition related to the node is designated by the query editor in the conventional document database managing system.

In FIG. 17, the query editor 171 is to designate a retrieve condition about a certain node "index", and is constructed of the attribute name displaying field 172 for displaying the attribute of the document under retrieval, the retrieve condition describing field 173 for describing the retrieve condition of the document, e.g., the name of writer, the domain displaying field 174 for displaying the model of attribute, and further the retrieve executing field 175 for executing the retrieve operation, or instructing the cancel (delete) operation.

Such a query editor 171 is initiated by the user to be graphically displayed on the display unit 158 as illustrated in FIG. 17.

The user designates the query so as to retrieve, for example, the route of the document by employing the query editor 171 graphically displayed on the display unit 158 (step 158).

Next, the user designates, for instance, the name of writer as the attribute name of the document to be retrieved in the attribute name instructing unit 1512 of the query editor 171 step 162).

Thereafter, the domain searching unit 1511 searches whether or not the domain of the designated attribute corresponds to the basic data model. When the domain corresponds to the basic data model, the domain searching unit 1511 displays the model name ("character string model" in attribute "Writer") on the domain display field 174 (step 163).

In case that the "character string model" is displayed as the domain defined by the document data by the domain searching unit 1511, the user designates the condition related to the attribute value at a predetermined position by the character string (step 164). For instance, when the retrieve condition is the name of writer, "HISASHI NAKATSUYAMA" corresponding to the name of writer is described by the character string in the retrieve condition describing field 173.

When it is so judged that the domain defined by the document data is not the basic data model, the user designates the subquery by the domain searching unit (step 165).

After either the condition related to the attribute value is designated, or the subquery is designated, the query editor 171 checks whether or not the designation of retrieve condition is completed (step 166).

When it is so judged that the designation of retrieve condition is accomplished, the query editor 171 completes the designation of retrieve condition. Conversely, when it is so judged that the designation of retrieve condition is not yet ended, the process operation is returned to the previous step 162 at which the above-described process is repeatedly performed based upon the designated subquery by the query editor 171.

After the retrieve condition designated in the above-described manner is once stored in the retrieve condition holding unit 1514, this retrieve condition is supplied to the retrieve formula producing unit 154. Then, the retrieve formula producing unit 154 automatically produces the retrieve formula for satisfying the retrieve condition.

When it is so judged that all of the retrieve conditions have been designated, the query editor 171 completes the process operation to designate the retrieve condition by the query editor 171.

Subsequently, the retrieve executing field 175 shown in FIG. 17 is clicks by the user, so that the retrieve formula evaluating unit 155 evaluates the evaluation formula produced by the retrieve formula producing unit 154 to retrieve the document for satisfying its retrieve condition from the database 156.

The display control unit 157 controls the query editor 171 and the display operation of the retrieved result to be displayed on the display unit 158.

As apparent from the flow chart shown in FIG. 16, since the queries are sequentially opened as to the lower constructive elements in the structured document in the above-described retrieving operation, the route is returned as the retrieved result.

In the query editor owned by the general-purpose document database managing system, the retrieve object is designated, depending upon the attribute of the object (node) in a certain class. When the domain of the attribute for the object belonging to a certain class corresponds to the basic data model, as represented in FIG. 17, the above-described query editor designates such a condition related to the attribute of the class indicative of this domain.

However, in accordance with the method for designating the retrieve condition shown in FIG. 17, the relationship between the nodes, which can be designated as the retrieve condition, is limited to the parent-child relationship.

As a result, when the document is managed by employing the general-purpose database managing system, there is such a problem that the retrieve condition could not be designated by using the query editor based upon the ancestor-descendant relationship, for instance, which descendant may satisfy the designated condition.

The reason why the retrieve condition is required based upon the ancestor-descendant relationship will now be explained by employing the below-mentioned SGML (Standard Generalized Markup language; ISO 8879) document type:

| | |
|---|---|
| <!DOCTYPE | article |
| <!ELEMENT | article - O (section+)> |
| <!ELEMENT | section - O (index, (paragraph|drawing|table)+, section *)> |
| <!ELEMENT | index - O (#PCDATA) |
| <!ELEMENT | paragraph - O (#PCDATA)> |
| <!ELEMENT | drawing - O (index, content of drawing)> |
| <!ELEMENT | table - O (index, content of table)> |
| <!ELEMENT | content of drawing - OEMPTY> |
| <!ELEMENT | content of table - OEMPTY> |
| <!ATTLIST | (content of drawing|content of table) file ENTITY #IMPLIED> |
| ▷ | |

The first column represents that the type of document is an "article".

The second column indicates that the document type "article" shows that more than one "section" is repeated.

The third column shows that a "section" owns an "index" and a combination of "paragraph", "drawing", "table", and they are arbitrarily selectable. The "section" may further have a plurality of "sections". In other words, a definition of an element of "section" is recursive, and a document instance with an arbitrary depth can be produced from this document type.

The fourth column denotes that data is present at a lower position of "index".

The fifth column shows that data is present at a lower position of "paragraph".

The sixth column indicates that there are an index and a content of a drawing at a lower position of "drawing".

The seventh column represents that there are an index and a content of a table at a lower position of "table".

The eight column indicates that none of elements is present at a lower position of "drawing content".

The ninth column shows that none of elements is present at a lower position of "table content".

The tenth column denotes that both of "drawing content" and "table content" are represented with reference to an external entity.

FIG. 18 is an explanatory diagram for explaining an instance example of "article" FIG. 19 is an explanatory diagram for explaining a layout of the instance of "article".

```
<article>
    <section>
        <index> 1 preface </index>
        <paragraph> it is first paraqraph of section 1 </paragraph>
        <section>
            <index> 1. 1 background </index>
            <paragraph> first paragraph of section 1.1 </paragraph>
            <paragraph> second paragraph of section 1.1 </paragraph>
            <section>
                <index> 1.1.1 preparation </index>
                <paragraph> content of section 1.1.1 </paragraph>
                <drawing>
                    <index> database managing system </index>
                    <drawing content file = DBMS>
                </drawings>
                <table>
                    <index> list of database managing system
                    </index>
                    <table content file = System>
                </table>
            </section>
        </section>
    </section>
</article>
```

In FIG. 18, there is shown that the above-described "article" is expressed in a tree structure. This "article" has such a layout as shown in FIG. 19 as a document. In other words, the drawings from "section 1" to "section 1.1.1" shown in FIG. 18 are stored into the first page, and the table of "section 1.1.1" in FIG. 18 is stored in the second page shown in FIG. 19.

As easily understood from this example, for instance, since the depth (namely, distance from route) or "paragraph" does not have a single meaning, there is substantially no meaning that the depth of "paragraph" is designated during the retrieving operation. Furthermore, since the retrieved range is unnecessarily narrowed, such a depth designation may cause another problem.

Since the designation by the conventional editor is carried out by way of the graphical user interface on the display, only the parent-child relationship can be designated but the ancestor-descendant relationship cannot be designated.

As to a second problem, a portion to be derived as the retrieved result cannot be designated in the conventional query editor. As previously stated, the retrieve condition cannot be designated only based on the attribute of a certain class in the conventional query editor. Also, the retrieved result is limited only to the instance of this certain class.

Considering now that the retrieving operation is carried out for the document type containing such a character string as "database" among a certain "paragraph" contained in such a "section" that an "index" is a "preface".

A demand issued by the user as the retrieved result is a "paragraph". If the depth of the required "paragraph" is known, then the "section" containing this paragraph can be retrieved in the query editor of the general-purpose database managing system.

However, since the demand issued by the user is "paragraph", the user must investigate the retrieved result to search such a "paragraph" for satisfying the retrieve condition.

The retrieve result of the above-described MULTOS is always the document, and a specific portion thereof cannot be derived. As a consequence, the query editor of the above-mentioned MULTOS does not have such a function to designate a specific portion of a document.

As a third problem, since the class is first designated to perform the retrieve operation in the conventional query editor, the instances belonging to a plurality of different classes cannot be designated as the retrieving objects at the same time. For instance, considering now that either a "table", or a "drawing", which contains such a character string of "database" in an "index" is retrieved from the above-explained document type.

In accordance with the conventional query editor, the "table" obtaining such a character string of "database" in the "index", and the "drawing" containing such a character string of "database" in the "index" are separately retrieved, and then these retrieved results must be summed in a set form.

SUMMARY OF THE INVENTION

The present invention has been made to solve the above-described problems, and therefore has an object to provide a document retrieving object instructing apparatus capable of instructing an object to be retrieved based upon a parent-child relationship as well as an ancestor-descendant relationship between constructive elements.

Another object of the present invention is to provide a document retrieving object instructing apparatus capable of issuing such an instruction to derive a specific portion as a retrieved result.

A further object of the present invention is to provide a document retrieving object instructing apparatus capable of simultaneously designating a plurality of retrieving objects.

A document retrieving object instructing apparatus, according to a first present invention, is employed in a document database managing system for managing a structured document constructed of document constructive elements, comprising:

instructing means (114 of FIG. 1) for instructing a condition related to the document constructive elements in said structured document;

connection condition instructing means (116 of FIG. 1) for instructing one of a parent-child relationship and also an ancestor-descendant relationship between said document constructive elements; and retrieving means (14, 15 of FIG. 1) for producing a retrieve condition based upon the instructions issued from said instructing means (114) and said connection condition instructing means (116) and for retrieving document data stored in a database (16 of FIG. 1) in accordance with said retrieve condition.

A document retrieving object instructing apparatus, according to a second present invention, further includes deriving object instructing means (115 of FIG. 1) for instructing that a specific portion of the document constructive elements in the structured document is derived as a retrieved result.

To the query editor according to the first invention, both the node designating means and the connection condition instructing means are newly added. Then, the condition related to the document constructive elements in the structured document is instructed by the instructing means. Either the parent-child relationship, or the ancestor-descendant relationship between the document constructive elements is instructed by the connection condition instructing means. The retrieving means automatically produces the retrieve formula based upon the instructions issued from the instructing means and the connection condition instructing means, and further the retrieve condition made based on the definitions related to a predetermined document data structure. In accordance with this retrieve formula, the document data for satisfying the retrieve condition is retrieved from the database.

That is, according to the first invention, the designation can be made of the node of the document constructive elements in the hierarchical document, and also the designation can be arbitrarily made of the parent-child relationship and the ancestor-descendant relationship between the constructive elements. Accordingly, it can be readily grasped such an upper/lower positional relationship in the structured document constructive elements.

On the other hand, according to the second invention, since a specific portion of the structured document constructive elements can be derived as the retrieved result by the deriving object instructing means, the execution of the retrieving operation is no longer required from the route. Also, such a retrieving operation can be done while grasping the parent-child relationship and the ancestor-descendant relationship.

BRIEF DESCRIPTION OF THE DRAWINGS

For a better understanding of these objects and features of the present invention, reference is made of the following detailed description of the invention to be read in conjunction with the following drawings, in which.

DETAILED DESCRIPTION OF THE PREFERRED EMBODIMENTS

Figure 1:
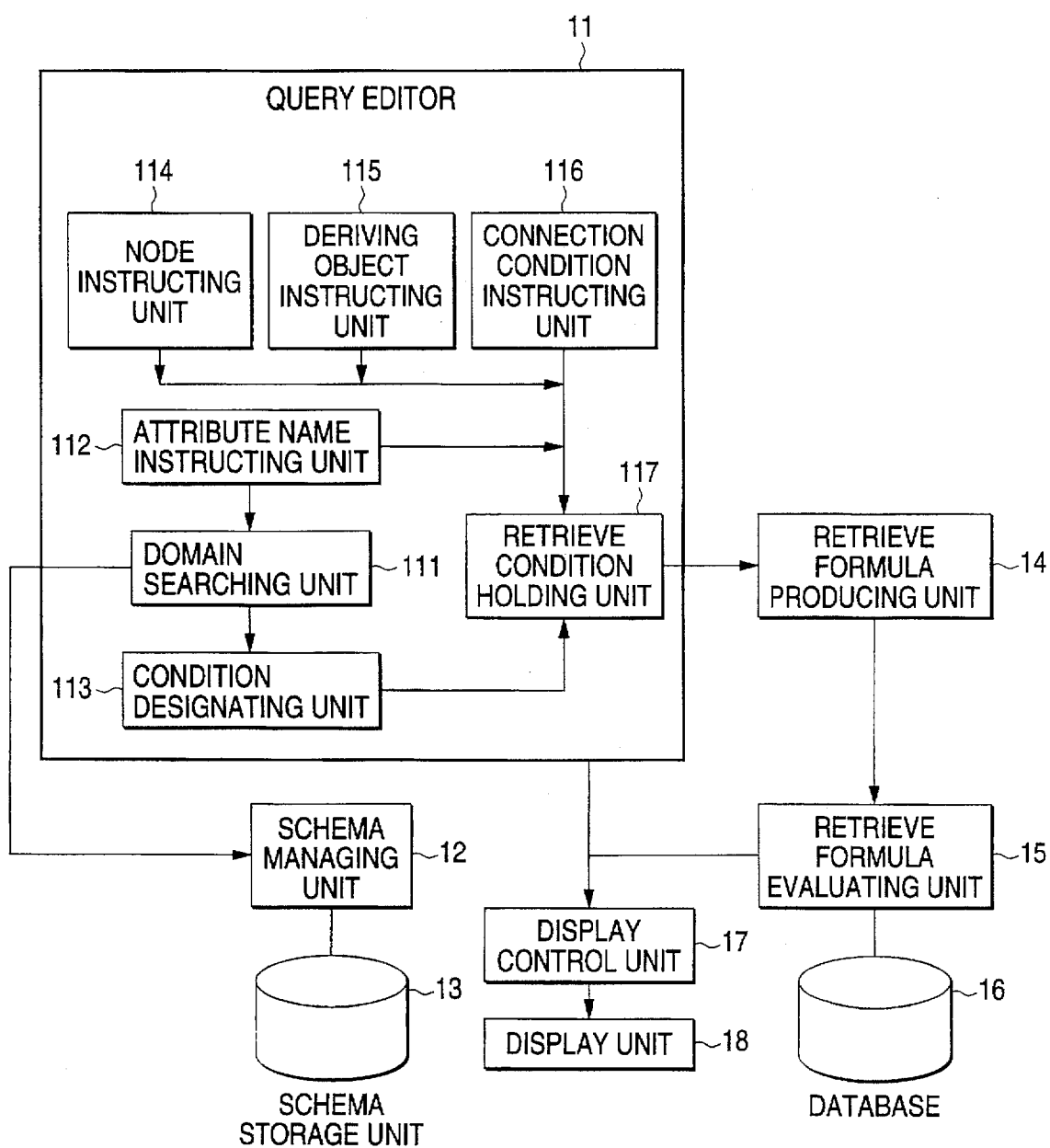
FIG. 1 is a schematic block diagram for explaining a document database managing system equipped with a query editor, according to an embodiment of the present invention.

In FIG. 1, there is schematically shown a block diagram of an arrangement of a document database managing system equipped with a query editor, according to an embodiment of the present invention. As shown in FIG. 1, the document database managing system of this embodiment is arranged by a query editor 11 for retrieving desired data from the stored database, a schema managing unit 12 for managing definitions related to structures of document data stored in the database, a schema storage unit 13 for storing therein the schema definitions, and a retrieve formula producing unit 14 for automatically producing a retrieve formula based on the retrieve condition designated by the query editor 11. The document database managing system further includes a retrieve formula evaluating unit 15 for executing a retrieval based upon the evaluated retrieve formula, a database 16 for storing structured documents, a display control unit 17 for controlling the query editor 11, and a display of the retrieve result, and a display unit 18 for displaying the query editor 11 and the retrieve result under control of the display control unit 17.

The query editor 11 is constructed of a domain searching unit 111 for searching how a structure of document data is built, for instance, whether the basic data model corresponds to the character string model, or the integer value model; an attribute name instructing unit 112 for instructing an attribute name such as a writer or a writing data of a document; a condition instructing unit 113 for instructing the retrieve condition; and a node instructing unit 114 for instructing a node of a constructive element for a structured document. This query editor 11 is further arranged by a deriving object instructing unit 115 for instructing as a deriving object either a specific portion, or a plurality of specified portions of the structured document constructive element; a connection condition designating unit 116 for instructing a connection condition indicative of either a parent-child relationship, or an ancestor-descendant relationship of the structured document constructive element; and a retrieve condition holding unit 117 for holding the attribute name instructed by the attribute name instructing unit 112, the retrieve condition instructed by the condition instructing unit 113, the node instructed by the node instructing unit 114, the specific portion and the plural portions instructed by the deriving object instructing unit 115, and also the connection condition instructed by the connection condition instructing unit 116 about the parent-child relationship, or the ancestor-descendant relationship.

Figure 2:
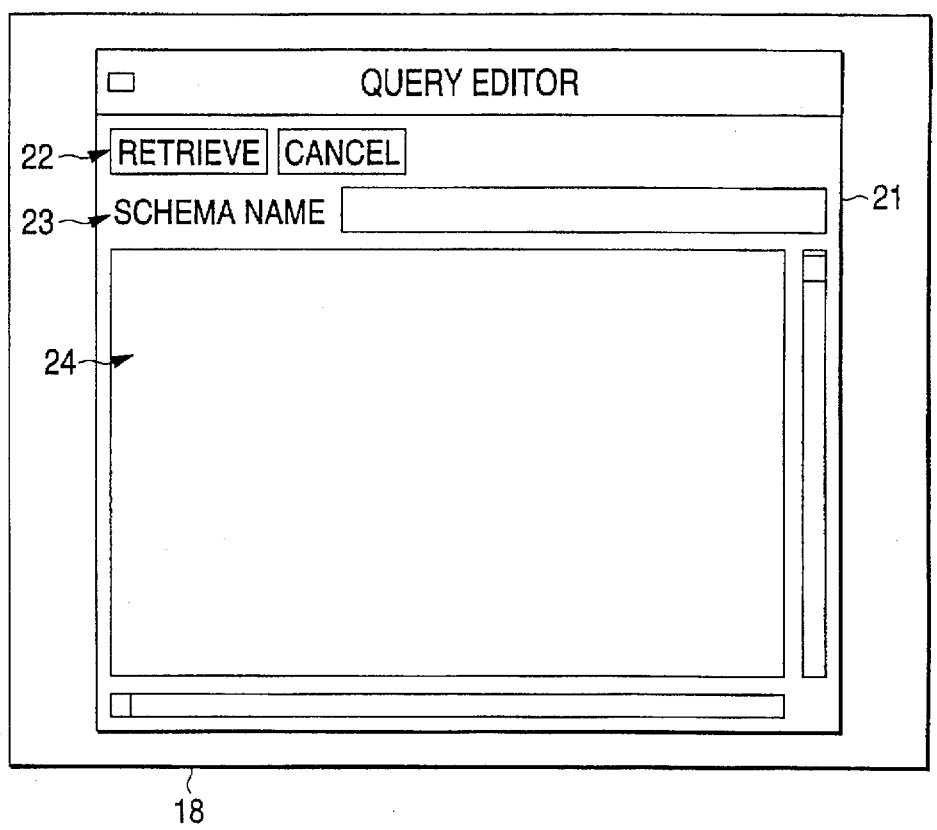
FIG. 2 schematically illustrates a retrieval screen displayed on the display unit when the equery editor is initiated based on the retrieving object instructing method, according to the embodiment of the present invention.

FIG. 2 schematically illustrates a retrieving screen represented on the display unit by initiating a query editor based on the retrieving object instructing method, according to the embodiment of the present invention.

In FIG. 2, a query editor 21 is constructed of a retrieve executing field 22 for executing or canceling a retrieval; a schema name describing field 23 for describing a schema name (document type name) displayed on the display unit 18 by a character string; and a document constructive element describing field 24 for describing the structured document constructive element by the character string and for connecting either the parent-child relationship thereof, or the ancestor-descendant relationship thereof by a link.

As illustrated in FIG. 2, the query editor 21 according to this embodiment is displayed as a window on the display unit 18 immediately after the query editor 21 is initiated.

Figure 3:
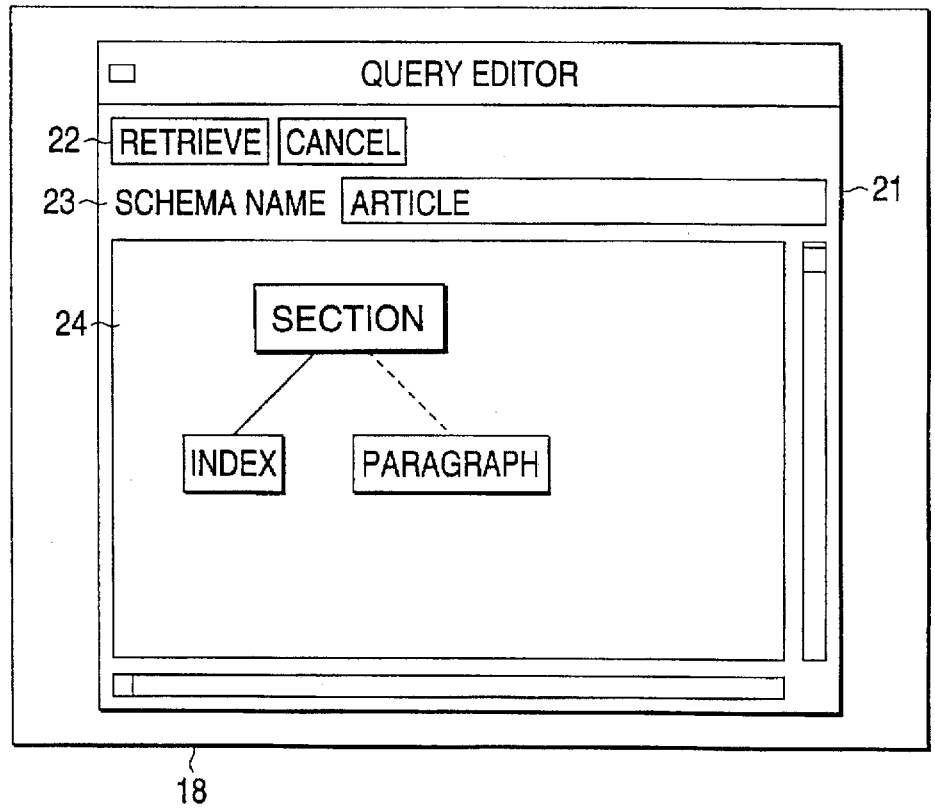
FIG. 3 is an explanatory diagram for explaining such a condition that a document constructive element and a relationship thereof are connected to the equery editor by a link, according to the embodiment of the present invention.

FIG. 3 is a schematic diagram for explaining such a condition that a document constructive element and a relationship thereof are connected to the query editor, according to the embodiment of the present invention.

In FIG. 3, a user describes structured document constructive elements in the window of the query editor 21 by the character string, and surrounds the respective constructive elements by, for instance, a solid line. Thereafter, the user connects either the parent-child relationship of the respective document constructive elements, or the ancestor-descendant relationship thereof by a link. For instance, the link indicated by the solid line implies the parent-child relationship, and the link indicated by the broken line implies the ancestor-descendant relationship.

Then, the query editor 21 may be graphically designated by surrounding the retrieving object by way of, e.g., a double line in the window represented on the display unit 18 in FIG. 3. A label of a node indicates a type name of a document constructive element. When a document type of a document constructive element is not designated, a node does not have a label.

As illustrated in FIG. 3, for example, a user describes an "article" in the schema name describing field 23 as a document type. After the user has designated a lower-graded document constructive element in such a document of "article" in the document constructive element describing field 24, a "section" is connected to an "index" by a link indicated by a solid line, whereas the "section" is connected by a "paragraph" by a link indicted by a broken line, by which each of them owns the ancestor-descendant relationship.

As shown in FIG. 3, as to the parent-child relationship and the ancestor-descendant relationship, a partial tree of such a document that the "section" is the vertex becomes the retrieved result. It should be noted both of the parent-child relationship and the ancestor-descendant relationship are not necessarily represented by way of the solid line and the broken line, but may be indicated by way of the discriminatable manner.

A decision as to whether one of two nodes connected by a solid line "or broken line) corresponds to a parent (ancestor), or a child (descendant) is made by an upper/lower relationship in the representation.

Figure 4:
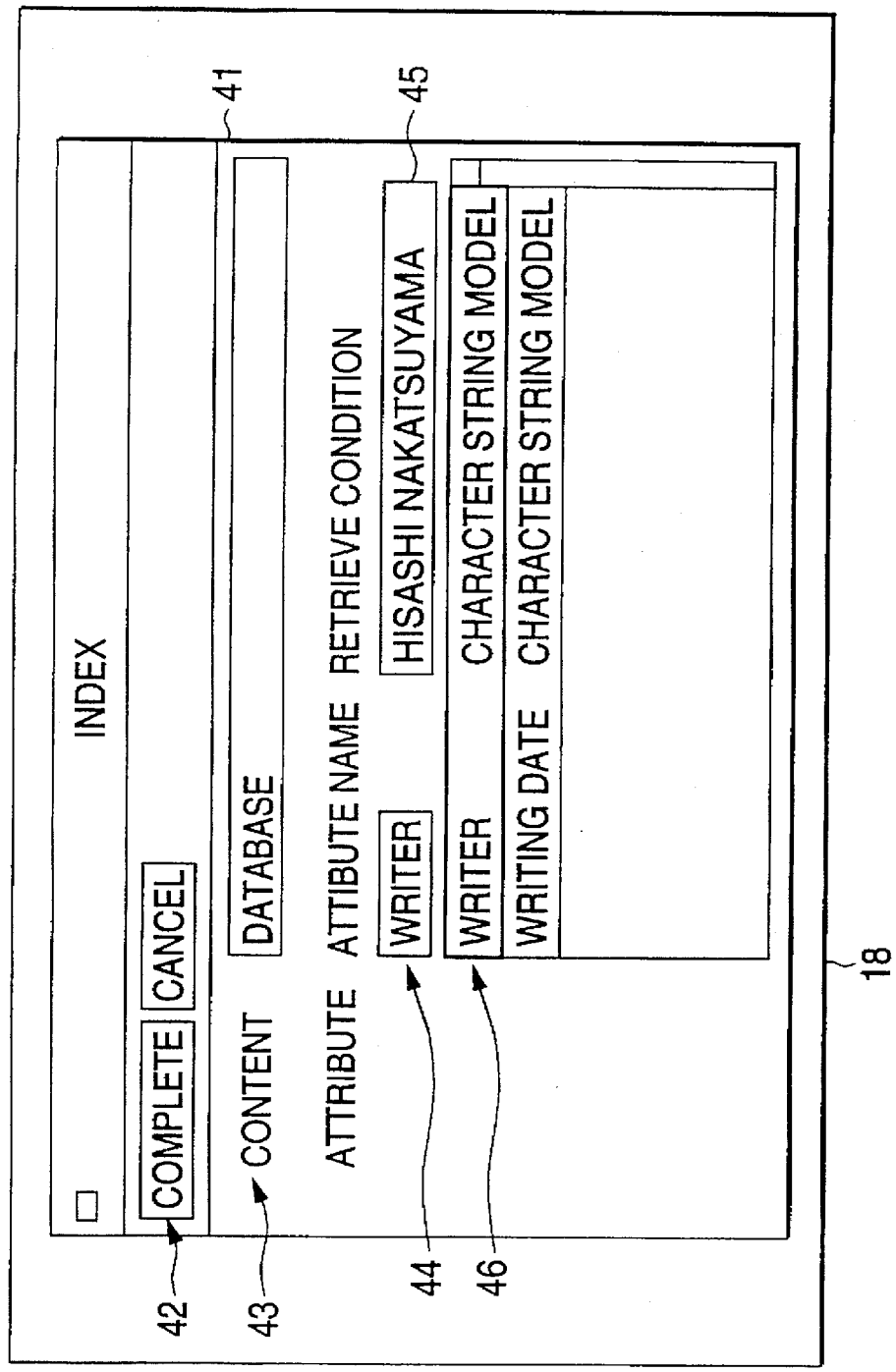
FIG. 4 is an explanatory diagram for explaining a designation of a retrieve condition related to a node in the query editor, according to the embodiment of the present invention.

FIG. 4 is a diagram for explaining that a retrieve condition related to a node is designated by a query editor.

In FIG. 4, a query editor 41 for designating a retrieve condition within a node makes a designation by a pop-up window. This query editor 41 is arranged by a retrieve condition executing field 42 for executing a completion/cancel of a retrieve condition, a retrieve content describing field 43 for describing a content of retrieval, and an attribute name displaying field 44 for displaying an attribute of a document to be retrieved. The query editor 41 further includes a retrieve condition describing field 45 for describing the retrieve condition of the document, for instance, a name of a writer, and a domain displaying field 46 for displaying a domain used to grasp whether the attribute corresponds to the character string model, or the integer value model.

It should be understood that the window as shown in FIG. 4 may be substituted by a subwindow (namely, component for constituting window) of the window indicated in FIG. 3.

In FIG. 4, the user describes a "database" corresponding to the retrieve condition in the retrieve content describing field 43. This indicates that a designation is made of a condition for retrieving whether or not such a description of "database" is present within the designated document constructive element.

Next, the user designates a "writer" corresponding to one of the document attributes displayed in the attribute name displaying field 44. Then, the user recognizes that the domain is the character string model by observing the "writer" in the domain display field 46. Thus, the user describes, for instance, "HISASHI NAKATSUYAMA" corresponding to the writer of the document in the retrieve condition describing field 45.

After all of the retrieve conditions have been described, the user clicks the retrieve condition executing field 42, so that the description of the retrieve condition is accomplished, and the retrieve condition is held in the retrieve condition holding unit 117 shown in FIG. 1.

Figure 5:
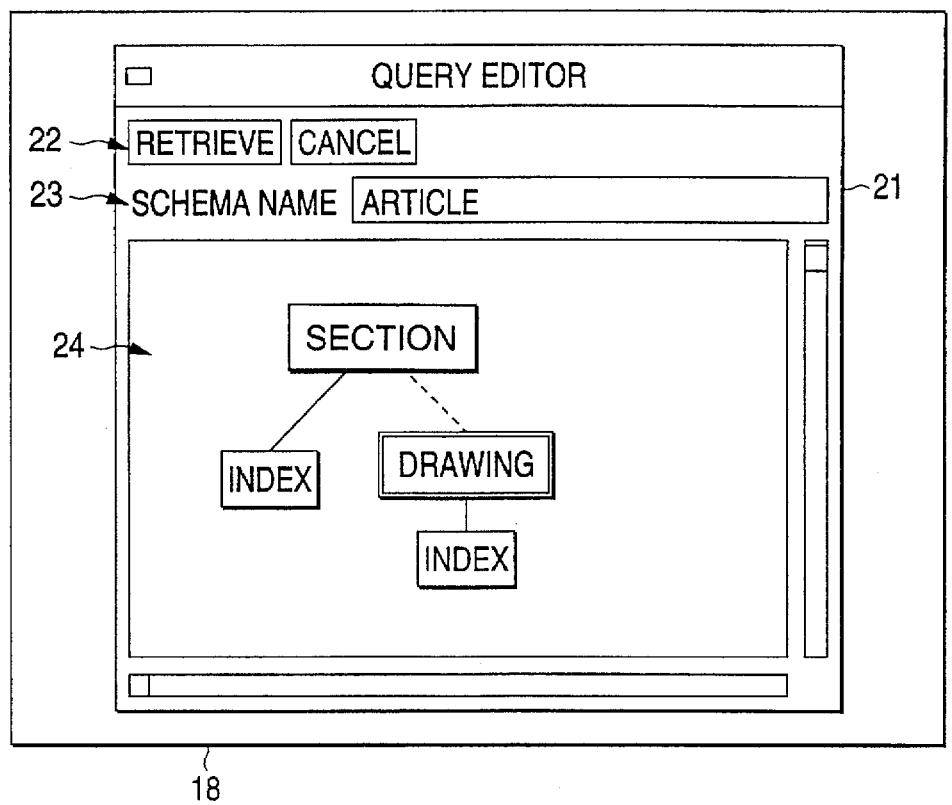
FIG. 5 is an explanatory diagram for explaining operation when an object to be derived is designated by the query editor, according to the embodiment of the present invention.

FIG. 5 is an explanatory diagram for explaining operations when an object to be derived by an equery editor is designated, according to the embodiment of the present invention.

In FIG. 5, the user describes a structured document constructive element is the document constructive element describing field 24, and designates a node to be derived by surrounding this node by a double line. In the example shown in FIG. 5, a partial tree of such a document that a "drawing" is a vertex becomes the retrieve result. It should be noted that the object to be derived is not necessarily required to be surrounded by the double line, but may be illustratively distinguished from other nodes.

In FIG. 5, such a retrieve condition is designated that a "drawing" having an index of "database managing system" is retrieved from a section containing such a character string as "database" in an index.

Figure 6:
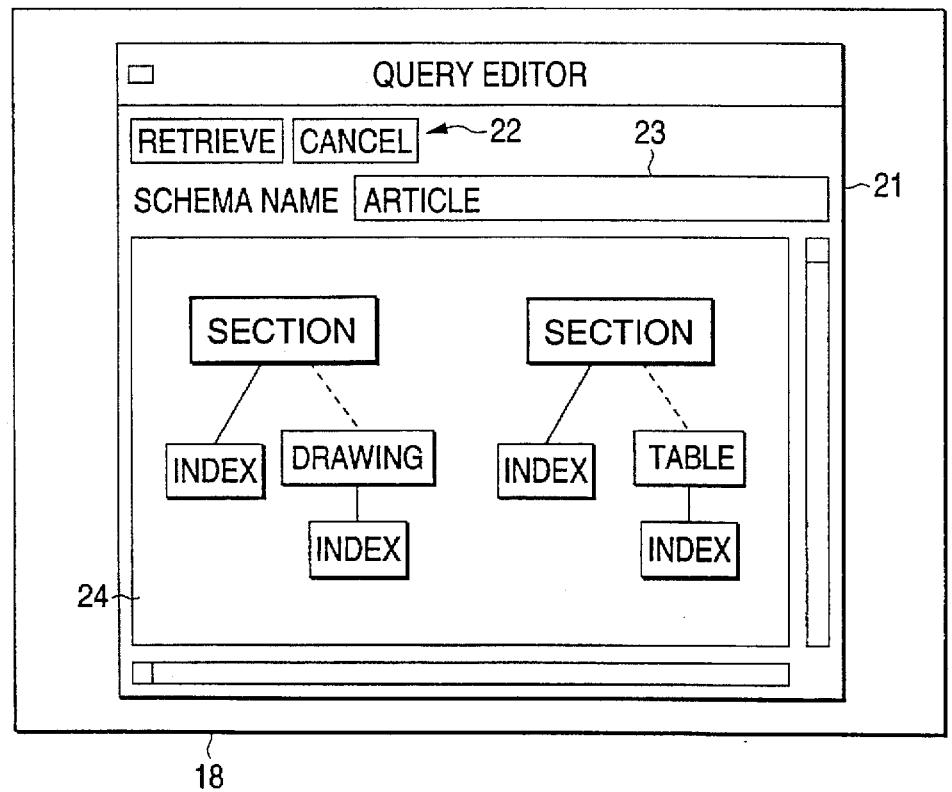
FIG. 6 is an explanatory diagram for explaining operation when a plurality of retrieving objects are simultaneously designated by the equery editor, according to the embodiment of the present invention.

FIG. 6 is an explanatory diagram for explaining such an example that a plurality of retrieving objects are simultaneously designated by a query editor, according to the embodiment of the present invention.

Figure 7:
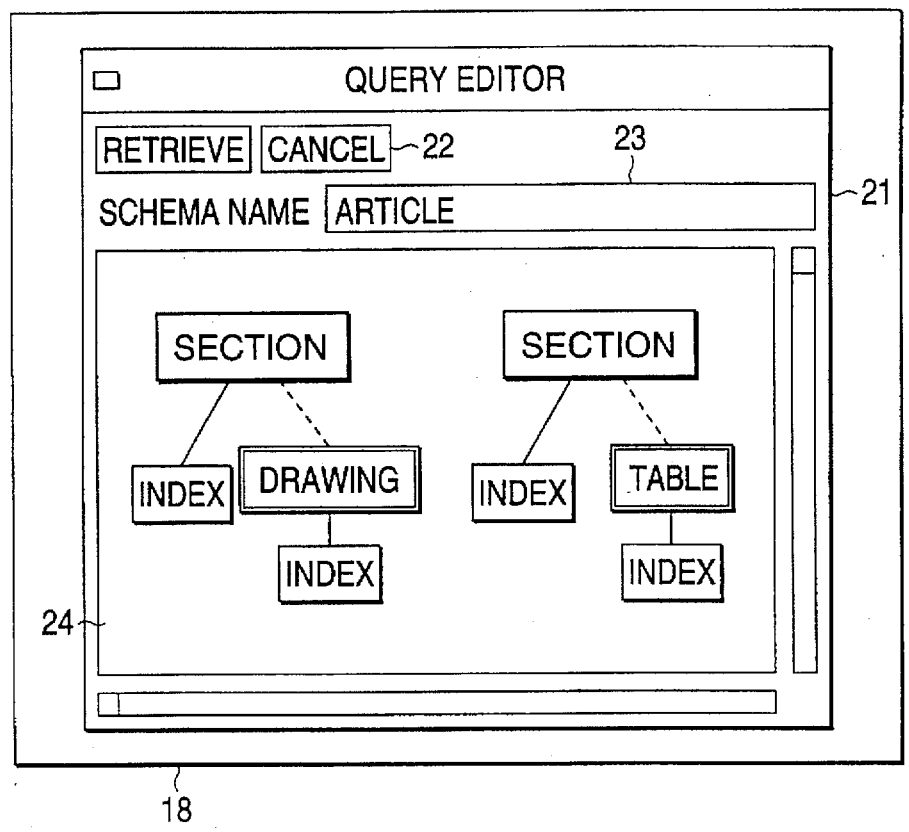
FIG. 7 is an explanatory diagram for explaining another example when a plurality of retrieving objects are simultaneously designated by the query editor, according to the embodiment of the present invention.

FIG. 7 is an explanatory diagram for explaining another example that a plurality of retrieving objects are simultaneously designated by a query editor, according to the embodiment of the present invention.

Figure 8:
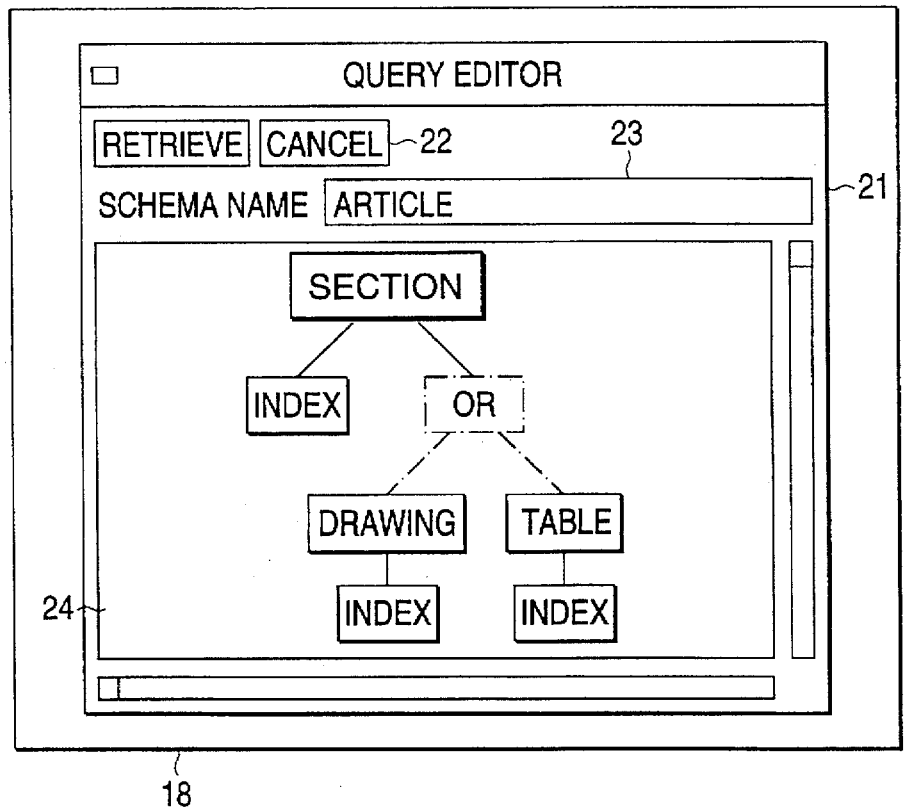
FIG. 8 is an explanatory diagram for explaining an example when both a plurality of retrieving objects and an object to be derived are designated in combination therewith by the query editor, according to the embodiment of the present invention.

FIG. 8 is an explanatory diagram for explaining an example that a plurality of retrieving objects and a deriving object are designated by a query editor, according to the embodiment of the present invention.

As represented in FIG. 6, the user describes a plurality of document constructive elements in the document constructive element describing field 24 in a parallel form.

In FIG. 7, when a plurality of retrieving objects are simultaneously designated, both a "drawing" and a "table" can be simultaneously designated by surrounding them by a double line. That is, in the example of FIG. 7, a plurality of retrieving objects are designated at the same time, and further the deriving object is designated.

It should be understood that a plurality deriving objects may be designated to the same partial tree. In such a case when it is not convenient that the trees obtained as the retrieve result include the involving relationships, such an interpretation is required that the ancestor tree is derived with a top priority.

As represented in FIG. 8, designations of the plural retrieve objects can be expressed by conducting a specific node for indicating a plurality of document constructive elements by OR.

The retrieve condition shown in FIG. 7 is equivalent to the retrieve condition shown in FIG. 8. A designation is made of such a retrieve condition that an object having a "table", or a "drawing" is retrieved from a section containing a character string of "database" as an index.

As described above, since the plural retrieve objects can be simultaneously designated, after these plural retrieve objects are separately retrieved, it is not necessary to calculate a summation set of these results.

Figure 9:
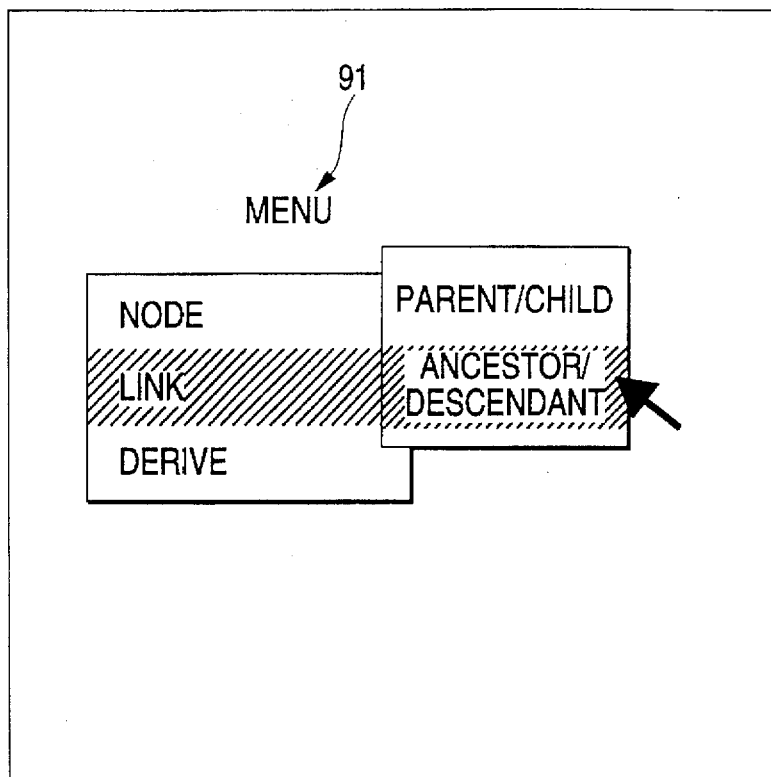
FIG. 9 is an explanatory diagram for explaining such an example that a retrieving object is instructed by way of a menu method, according to the embodiment of the present invention.
Figure 10:
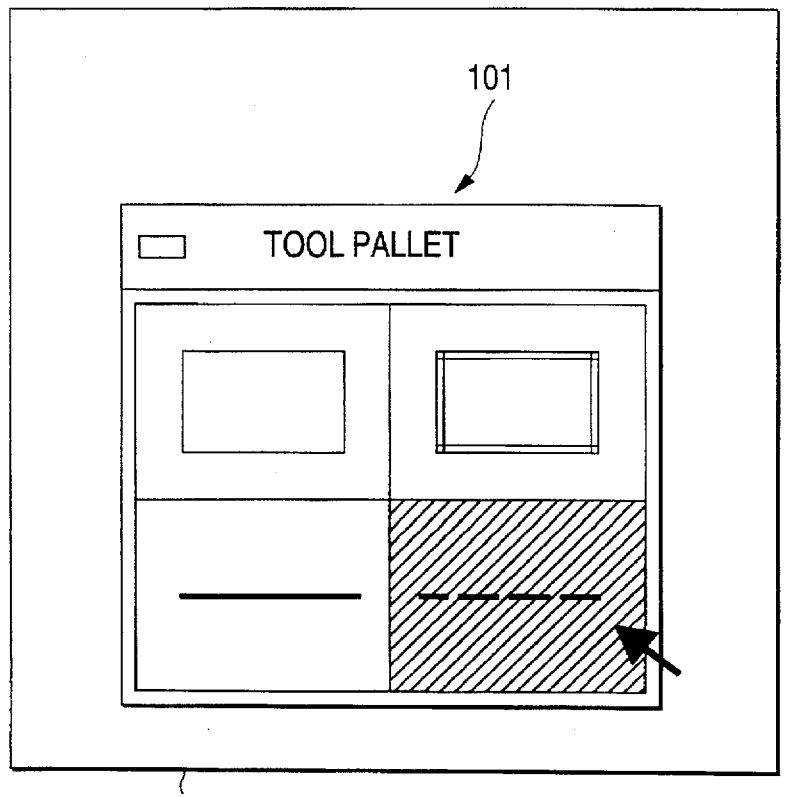
FIG. 10 is an explanatory diagram for explaining such an example that a retrieving object is instructed by a tool pallet, according to the embodiment of the present invention.

FIG. 9 is an explanatory diagram for explaining such an example that a retrieve object is instructed by way of the menu method, according to the embodiment of the present invention. FIG. 10 is an explanatory diagram for explaining another example that a retrieve object is instructed by way of a tool pallet.

When the user calls such a pop-up menu (hierarchical menu in this case) as shown in FIG. 9 on the display unit 18 and selects the node by a cursor during the designation of retrieve object, the document constructive element describing field 24 is displayed, and then the document constructive element to be retrieved is instructed in this field by the cursor. Also, he connection relation of the document constructive element is selected by a link by using the cursor, so that this link indicates either the parent-child relationship, or the ancestor-descendant relationship.

As represented in FIG. 10, the user calls the tool pallet on the display unit 18, so that a selection can be made of a frame used to derive a node, a double line frame used to designate a specific node, and a link for indicating a parent-child relationship and an ancestor-descendant relationship.

Figure 11:
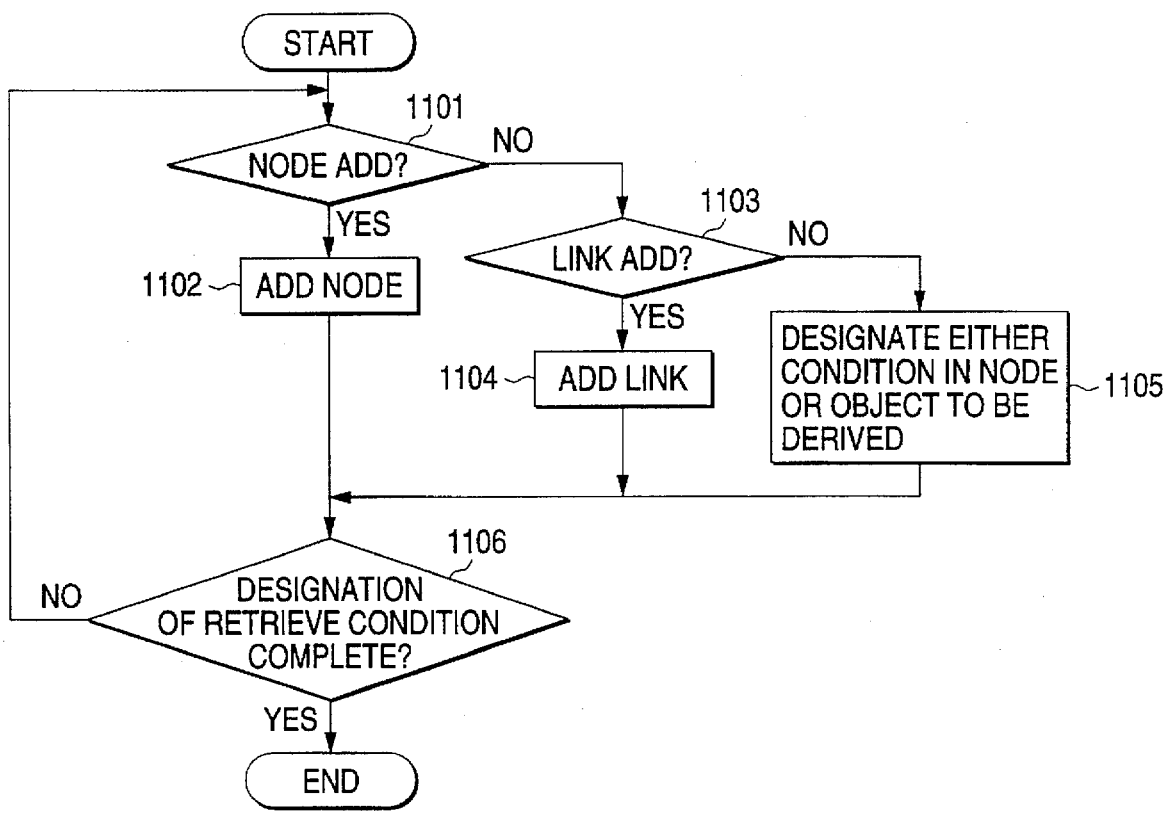
FIG. 11 is a flow chart for explaining a method for designating a retrieving object, according to the embodiment of the present invention.

FIG. 11 is a flow chart for explaining a method for designating a retrieving object, according to the embodiment of the present invention.

When the user initiates the query editor, the window shown in FIG. 2 is displayed. The user checks whether the node of the structured document is additionally provided in the document constructive element describing field 24 shown in FIG. 2 for the retrieve purpose (step 1101).

When the node is added, the node is added by the node instructing unit 114 shown in FIG. 1 (step 1102). The additionally set node is held in the retrieve condition holding unit 117 shown in FIG. 1.

At the step 1101, when the node is not added, the user checks whether or not a link is added (step 1103).

When the link is added, this link adding operation is carried out by the connection condition designating unit 116 shown in FIG. 1. This link is stored into the retrieve condition holding unit 117 shown in FIG. 1 (step 1104). When the link is added, a check is made as to whether or not the illustrated structure may satisfy such a condition as a tree. In other words, an investigation is done as to whether or not the parent (otherwise, ancestor) of any nodes is at the most, one parent and also whether or not the illustrative upper/lower relationship is present in the nodes located at both ends of the link.

When the link is not added, either the condition within the node, or the object to be derived is designated by the attribute name designating unit 112, the domain searching unit 111, and the condition designating unit 118, represented in FIG. 1.

Upon designation of the attribute, the domain searching unit 111 checks the domain of this attribute by the schema managing unit 12 of the database managing system. The user interface corresponding to this domain initiates, for instance, the window as shown in FIG. 4 to designate the condition concerning the attribute (step 1105).

Also, the condition concerning the attribute is stored in the retrieve condition holding unit 117 shown in FIG. 1. The object to be derived is designated by the deriving object instructing unit 115 shown in FIG. 1. Then, the above-described designated information is stored in the retrieve condition holding unit 117 shown in FIG. 1.

Then, the user checks whether or not all of the instructions to the retrieve condition have been completed. When the instruction to the retrieve condition is not yet accomplished, the process operation is returned to a step 1101. At this step 1101, a similar process operation to the above-described operation is repeatedly performed. When the instructions to the retrieve condition have been completed, this process operation is ended (step 1106).

It should be noted that when the instructions to the retrieve condition are complete, such a node having no parent will be handled as a route.

In the case that either the menu 91 shown in FIG. 9, or the tool pallet 101 indicated in FIG. 10 are employed, when this menu 91 is selected, or the tool pallet 101 is selected, a process operation similar to that of the flow chart shown in FIG. 11 is carried out.

Then, the retrieve condition which has been designated and held in the retrieve condition holding unit 117 is converted into the retrieve formula of the document database managing system by the retrieve formula producing unit 14 shown in FIG. 1. Thereafter, the retrieve formula evaluating unit 15 executes the retrieving operation based on the retrieve formula.

It is assumed that the query language employed in the document database managing system is such a syntax as shown by Backus-Naur Form (BNF) as follows:

In this syntax, the OR node shown in FIG. 8 is not expressed. "Type", "return", "has", and "contains" correspond to reserved words.

Symbol "ε" indicates an empty character string. The reserved word "return" is to instruct that such a partial tree that the subsequently designated type is used as a vertex is derived. The reserved words "has" and "contains" represent that the subsequent conditions relate to a child and a descendant, respectively.

```
<retrieve formula>: : = ε|<node condition> <connection
condition>";" <retrieve formula>
<node condition>: : ='type' <derive instruction> <type
name> <attribute condition>
<derive instruction>: : = ε| '↑'
<attribute condition>: : = ε| <attribute name>= <attribute
value designation>
<connection condition>: : = ε
              |<connection relationship><node condition>
              |<connection relationship><node condition>
              <connection condition>
<connection relationship>: : = ε 'has' | 'contains'
```

When the connection relationship becomes vague, this relationship is properly put by parentheses. For the sake of simplicity, the attribute condition contains only equations.

In accordance with the above-described syntax, the retrieve formula shown in FIG. 5 is given as follows:

| type section | has (type index) |
| | contains (type drawing (has index)); |

Also, the retrieve formula indicated in FIG. 7 is given as follows:

| type section | has (type index) |
| | has (type ↑ drawing (has index)): |
| type section | has (type index) |
| | has (type ↑ table (has index)); |

Note that symbol "↑" indicates that a description subsequent to this symbol is an object to be derived, and symbol ";" denotes an end of a sentence.

Figure 12:
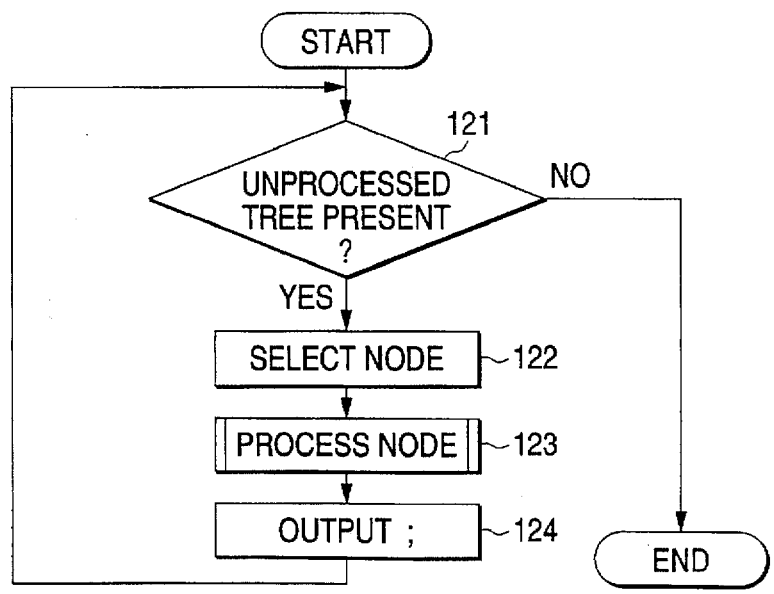
FIG. 12 is a flow chart for describing a conversion from a retrieve condition designated by the query editor into a retrieve formula represented by a query language, according to the embodiment of the present invention.
Figure 13:
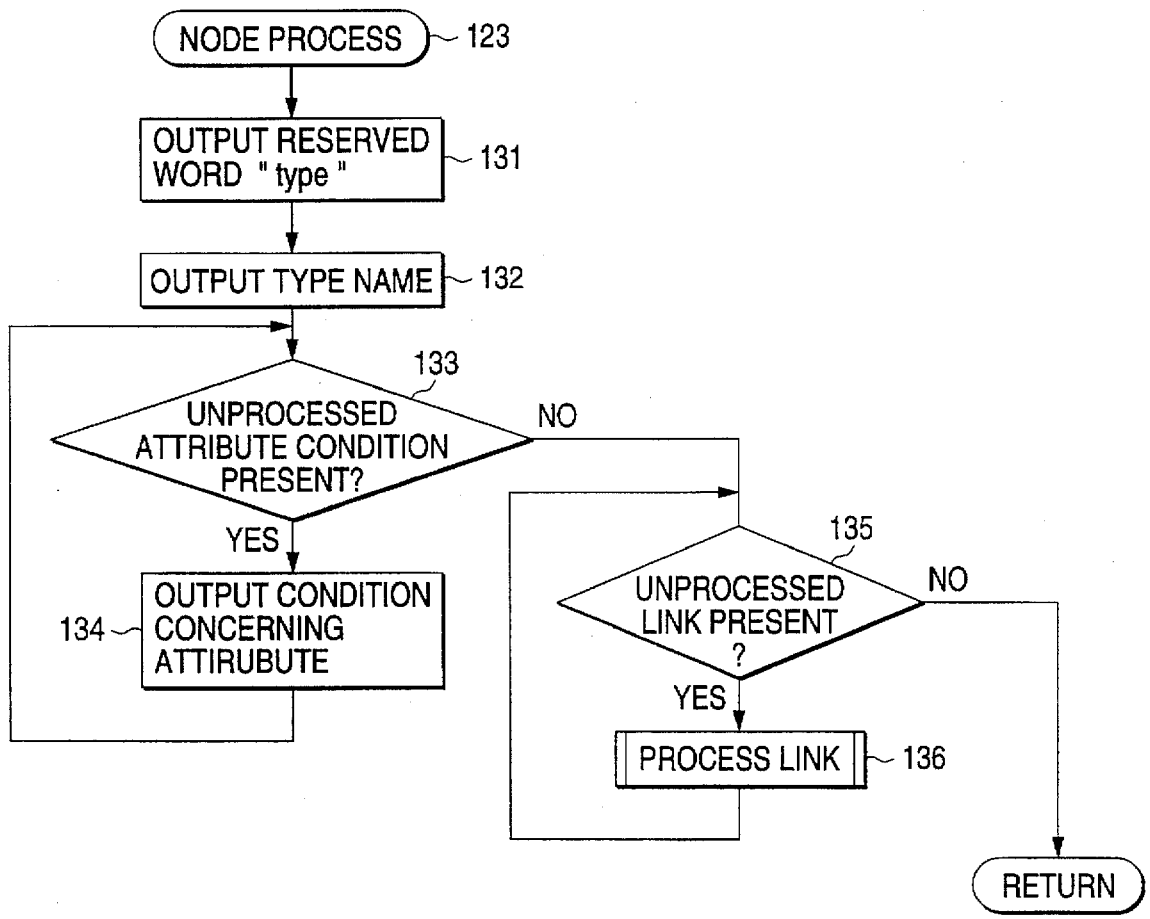
FIG. 13 is a flow chart for explaining a subroutine of a node in FIG. 12.
Figure 14:
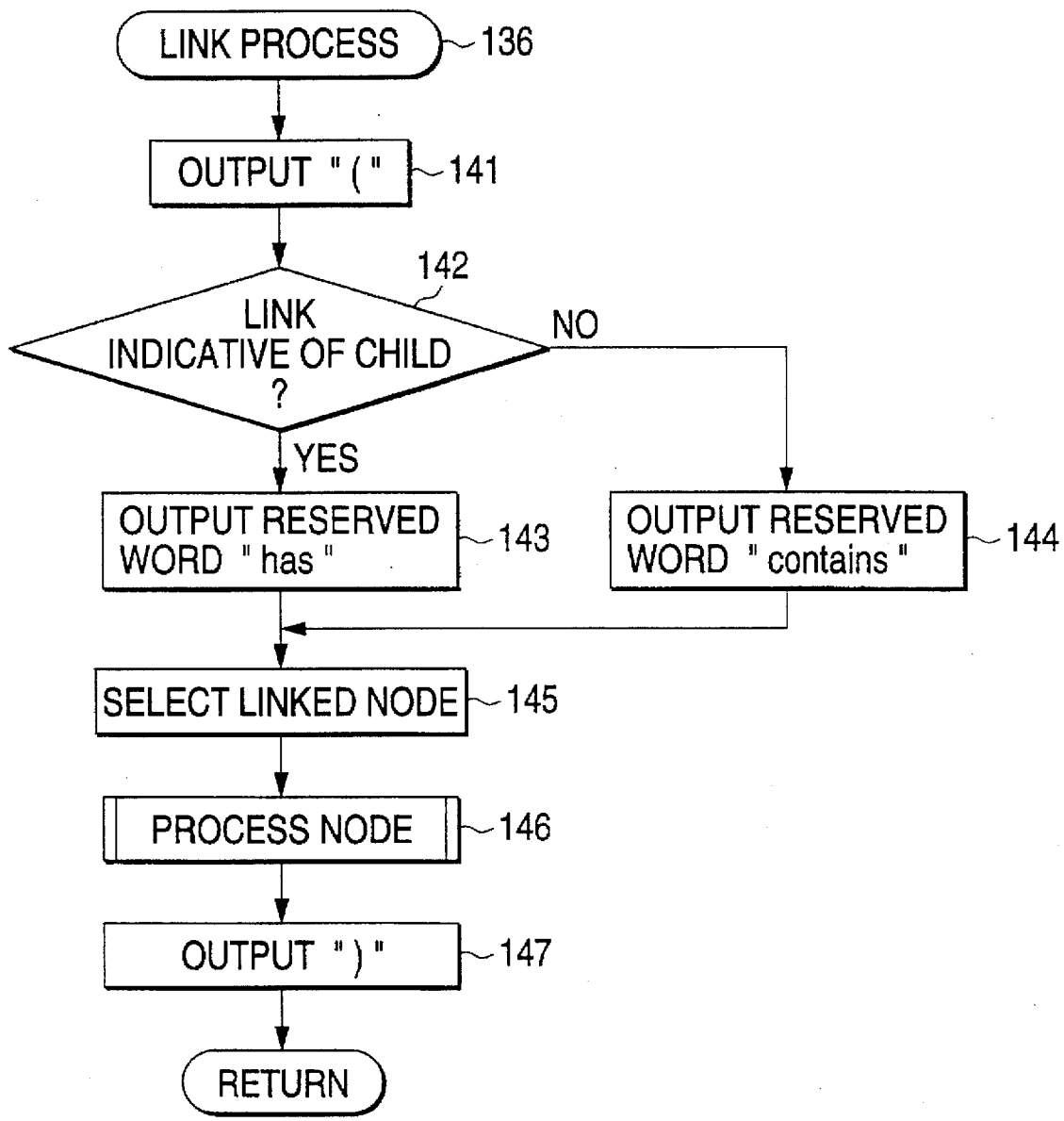
FIG. 14 is a flow chart for explaining a subroutine of a link in FIG. 12.
Figure 15:
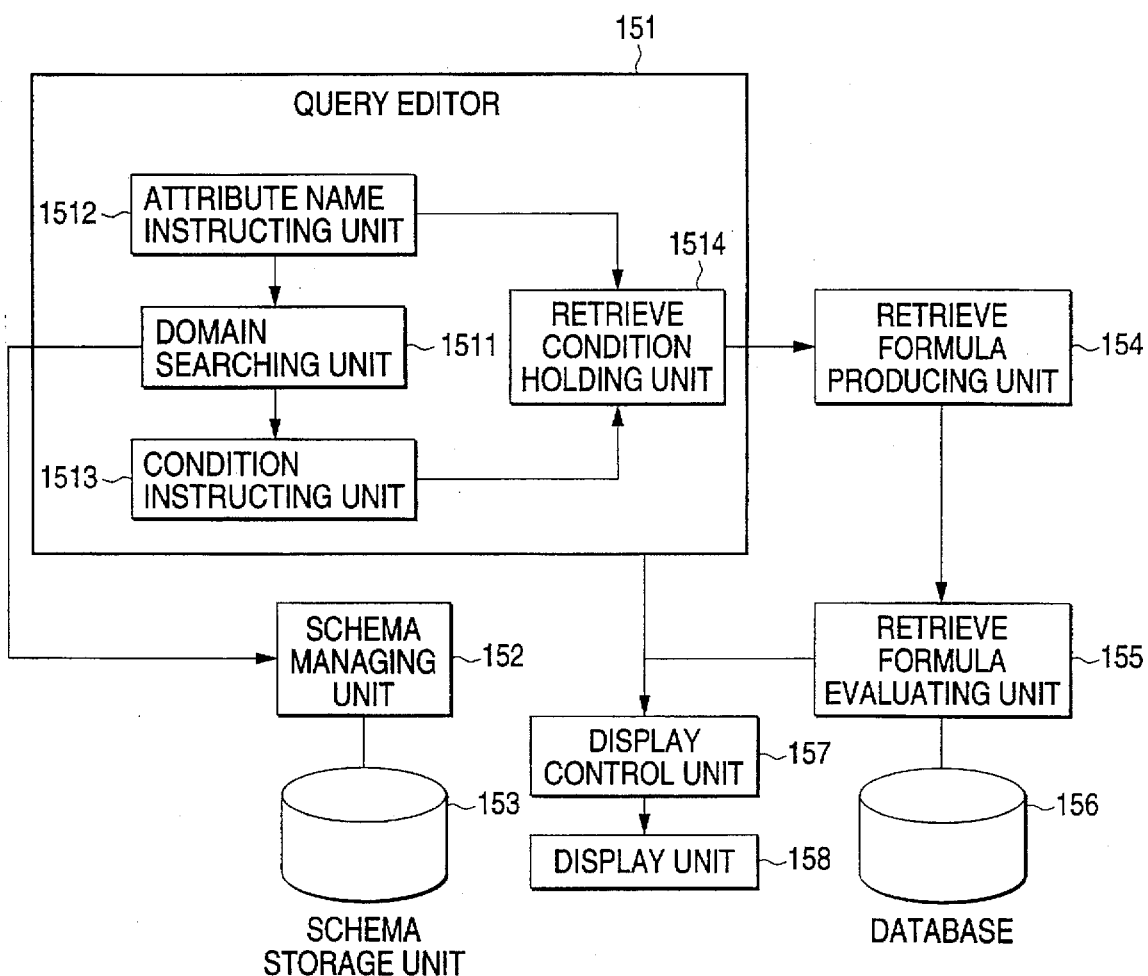
FIG. 15 is the schematic block diagram for showing the conventional document database managing system equipped with the query editor.
Figure 16:
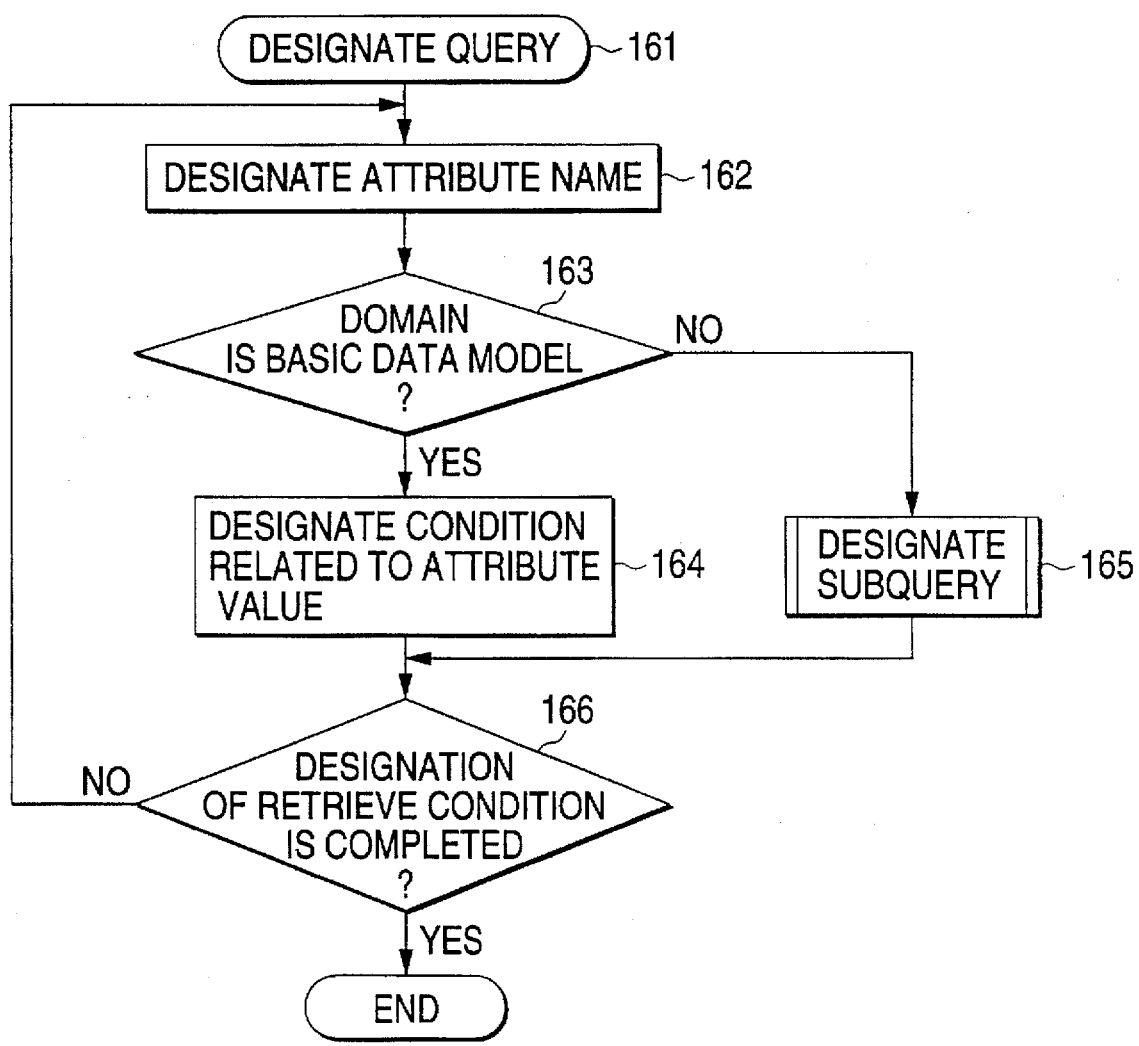
FIG. 16 is the flow chart for explaining the process by the query editor in the conventional system.
Figure 17:
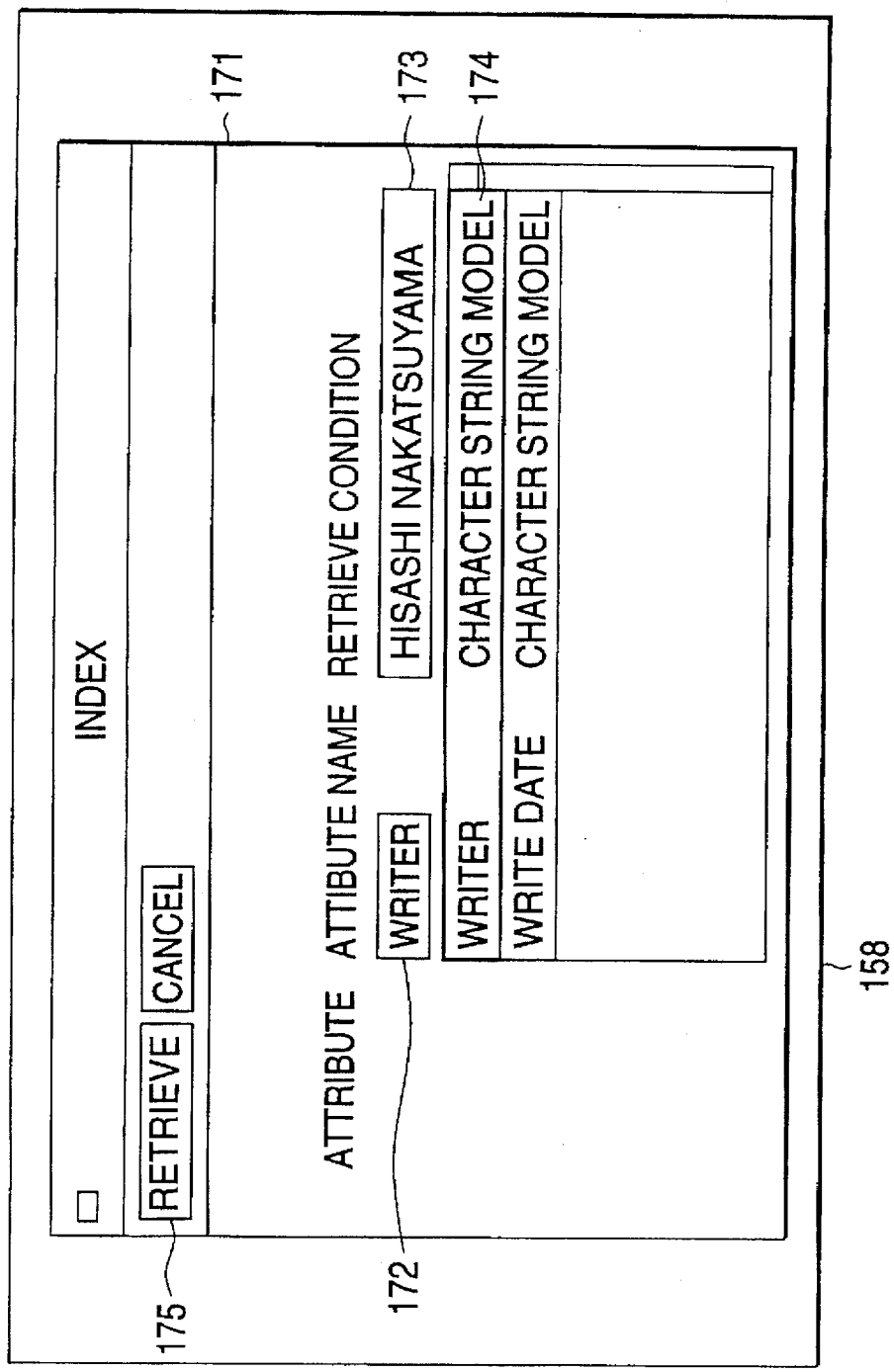
FIG. 17 is the explanatory diagram for explaining the operation when the retrieve condition related to the node is designated by the query editor in the conventional system.
Figure 18:
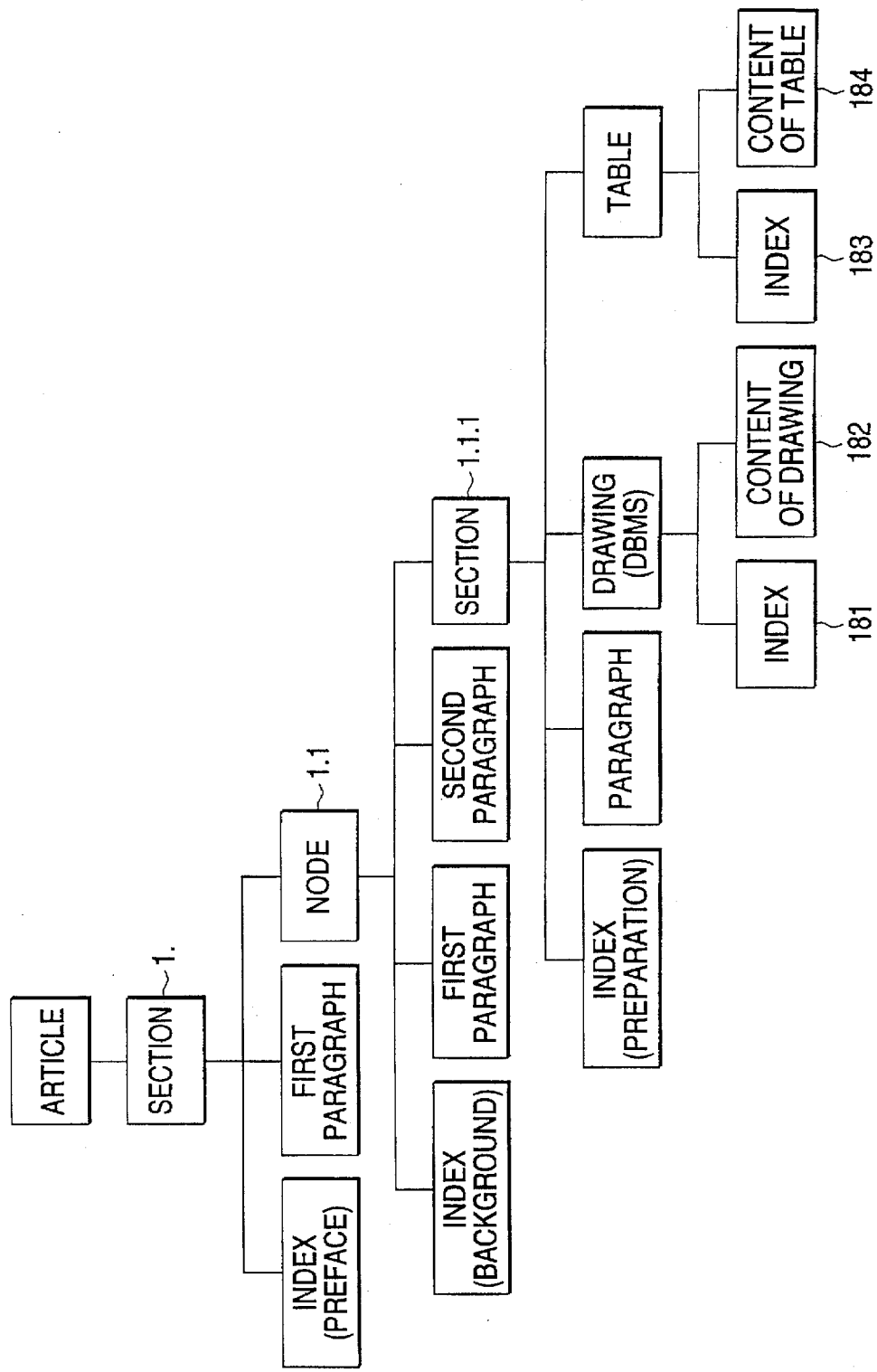
FIG. 18 is an illustration for explaining an instance of "an article"
Figure 19:
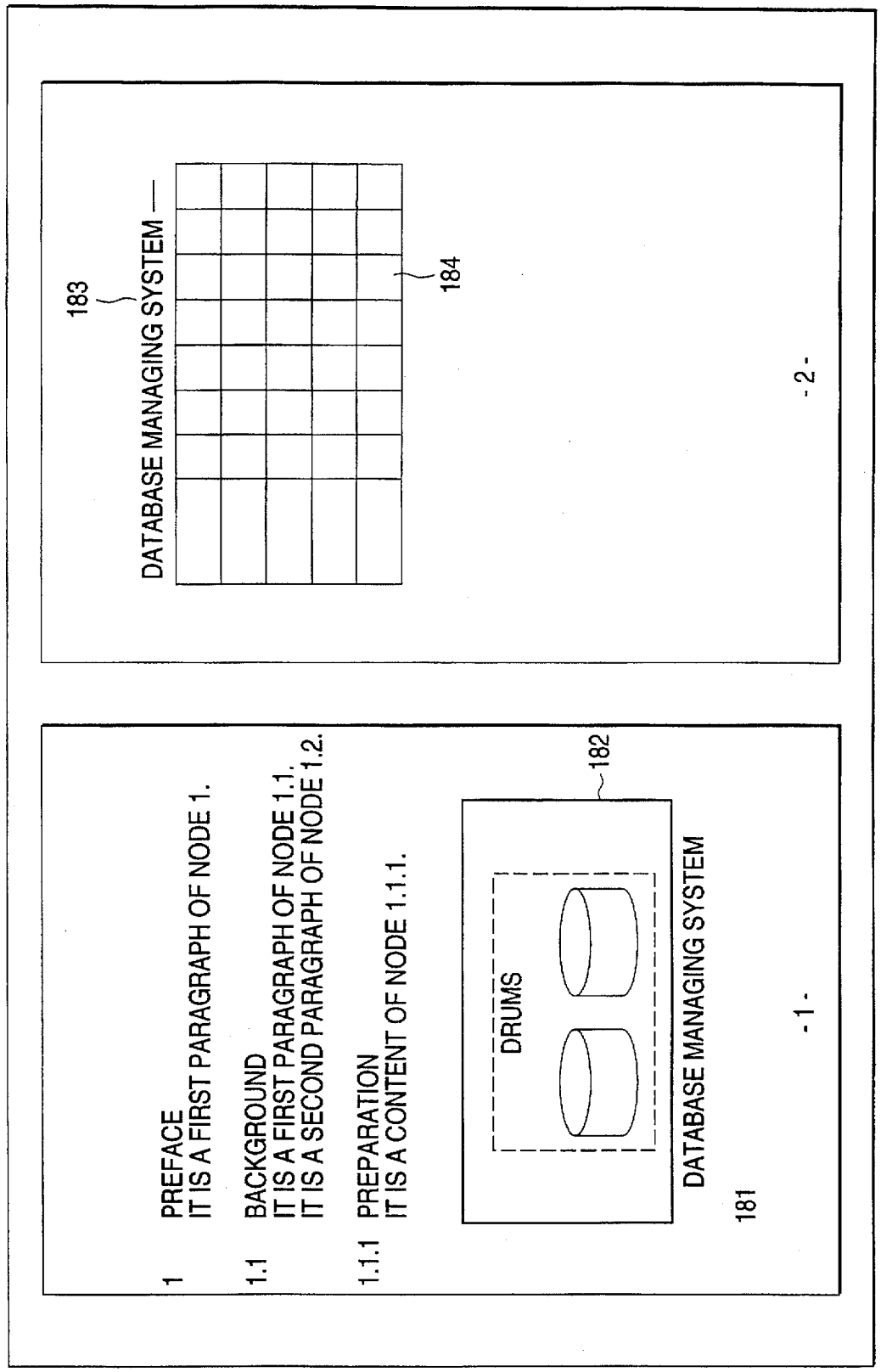
FIG. 19 is an illustration for explaining an instance layout of "an article".

FIG. 12 is a flow chart for explaining operations that the retrieve condition designated by the query editor is converted into the retrieve formula expressed by the query language, according to the embodiment of the present invention. FIG. 13 is another flow chart for explaining subroutine operations of the node in FIG. 12. FIG. 14 is a further flow chart for explaining subroutine operations in FIG. 13.

As to the respective trees of the retrieve condition designated by the query editor, the node and the link are processed.

First, a check is done by the retrieve formula producing unit 14 as to whether or not there is an unprocessed tree in the conversion into the retrieve formula expressed by the query language (step 121).

When it is so judged that the unprocessed tree is present, the retrieve formula producing unit 14 selects one of the unprocessed trees and selects a node thereof (step 122).

When it is so judged that there is no unprocessed tree, the retrieve formula producing unit 14 accomplishes the process operation.

The node selected at the step 122 is called as a procedure "node" which will be processed in a subroutine (will be discussed later)(step 123).

When the process operation of the above-described procedure "node" is completed, the retrieve formula producing unit 14 outputs ";" at the last portion of the retrieve formula (step 124).

The retrieve formula producing unit 14 returns to the above-described step 121 until there is an unprocessed tree, at which a similar process operation is repeatedly carried out.

In the procedure "node" shown in FIG. 13, the retrieve formula producing unit 14 outputs a reserved word "type" (step 131).

Subsequent to this reserved word "type", the retrieve formula producing unit 14 outputs a type name thereof, for instance, such a document constructive element name as a "chapter" and a "section" (step 132).

The retrieve formula producing unit 14 checks whether or not there is an unprocessed attribute condition (step 133).

When it is so judged that the unprocessed attribute conditions are present, the retrieve formula producing unit 14 successively selects one of the unprocessed attribute conditions disappear, and then outputs the condition related to this attribute (step 134).

When it is so judged that there is no unprocessed attribute condition, the retrieve formula producing unit 14 further checks whether or not an unprocessed link is present (step 135).

When it is so judged that there is no unprocessed link, the formula producing unit 14 causes the process operation of the procedure "node" to be recovered to the original process operation.

To the contrary, when it is so judged there are unprocessed links, the retrieve formula producing unit 14 successively selects one of the unprocessed links until these unprocessed links disappear. The selected link is called as a procedure "link" which will be processed in a subroutine (will be discussed later) (step 136).

In the procedure "link", the retrieve formula producing unit 14 outputs "(" (step 141). That is to say, the above-described parentheses are to discriminate the ancestor-descendant relationship.

The retrieve formula producing unit 14 checks whether or not a "link" corresponds to such a link indicative of a child (step 142).

When a judgement is made that the link indicates the child, the retrieve formula producing unit 14 outputs such a reserved word "has" (step 143).

When another judgement is made that the link does not represent the child, but the descendant, the retrieve formula producing unit 14 outputs another reserved word "contains" (step 144).

Next, the retrieve formula producing unit 14 selects a node connected to the link (step 145).

To retrieve formula producing unit 14 calls a "node" (step 146). That is to say, the retrieve formula producing unit 14 repeatedly executes the above-described process operation as indicated in FIG. 13 until there is a process to be executed.

When the procedure "node" is accomplished, the retrieve formula producing unit 14 outputs "(" and the process for the procedure "link" is recovered to the original process (step 147).

The retrieve formula produced in the above-described process operation is evaluated by the retrieve formula evaluating unit 15 shown in FIG. 1., and the document data for satisfying the retrieve condition is retrieved from the database 16 to be displayed on the display unit 18.

Although a sequence of a brother/sister relationship is not concerned in this embodiment, this brother/sister relationship may be expressed by a positional relationship of the displayed nodes.

It should be noted that although the ancestor is displayed at the upper position and the descendant is displayed at the lower position in this embodiment, the present invention is not limited thereto if the directions of these ancestor and descendant are wholly defined. For instance, such a representation is acceptable that an ancestor is positioned at a left side, whereas a descendant is positioned at a right side.

In accordance with this embodiment, the designated retrieve condition is executed after being converted into the retrieve formula of the document database management system. The retrieve formula may be expressed by such a query language as "Maestro". The retrieve operation may be executed in accordance with such a method as described in the publication "A Query Language for Retrieving Information from Hierarchic Text Structures" by Ian Macleod, THE COMPUTER JOURNAL, 1990.

As previously described in detail, according to the present invention, since the designating means and the connection condition designating means are provided with the query editor, the retrieve condition can be easily designated based on the ancestor-descendant relationship, which could not be described in the conventional query editor. Further, since both the parent-child relationship and the ancestor-descendant can be readily grasped by arbitrarily instructing the relevant relationship by way of the connection condition designating means, the retrieve condition can be quickly designated in a simple manner.

Moreover, according to the present invention, since the deriving object instructing means is provided with the query editor, the object to be derived as the retrieve result can be designated and also a plurality of retrieve objects can be simultaneously designated, which could not be described in the conventional query editor. As a consequence, the descriptive force of the retrieve condition could be improved, as compared with that of the conventional query editor.

What is claimed is:

1. A document retrieving object instructing apparatus that enables users to instruct a retrieval condition or conditions regarding an object to be retrieved, used in a document database managing system for managing a database of structured documents each constructed of document constructive elements, comprising:

instructing means for instructing a search condition using the document constructive elements in searching said structured documents;

connection condition instructing means for instructing a search condition using one of a parent-child relationship and an ancestor-descendant relationship that is not a parent-child relationship between said document constructive elements in searching said structured documents; and retrieving means for producing said retrieval condition based upon the instructed search conditions issued from said instructing means and said connection condition instructing means and for retrieving document data stored in the database in accordance with said retrieval condition.

2. The document retrieving object instructing apparatus as claimed in claim 1, further comprising:

derived object instructing means for instructing that a specific portion of the document constructive elements in the retrieved document data be derived as an object distinguished within the retrieved document data.

* * * * *